(12) United States Patent
Taghizadeh-Kaschani

(10) Patent No.: US 6,222,356 B1
(45) Date of Patent: Apr. 24, 2001

(54) CURRENT MODE SWITCHING REGULATOR CONFIGURED SUCH THAT A MEASURING RESISTOR IS NOT NEEDED TO MEASURE THE CURRENT AT AN INDUCTOR

(75) Inventor: Karim-Thomas Taghizadeh-Kaschani, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/283,903

(22) Filed: Apr. 1, 1999

(30) Foreign Application Priority Data

Apr. 1, 1998 (DE) ................................................ 198 14 681

(51) Int. Cl.[7] ............................................................ G05F 1/40

(52) U.S. Cl. .............................................. 323/288; 323/290

(58) Field of Search ...................................... 323/288, 284, 323/285, 290, 293

(56) References Cited

U.S. PATENT DOCUMENTS

| | | | | |
|---|---|---|---|---|
| 4,553,082 | * | 11/1985 | Nesler | 323/288 |
| 4,959,606 | * | 9/1990 | Forge | 323/286 |
| 5,367,247 | * | 11/1994 | Blocher et al. | 323/222 |
| 5,627,459 | * | 5/1997 | Itoyama et al. | 323/284 |

* cited by examiner

*Primary Examiner*—Shawn Riley
(74) *Attorney, Agent, or Firm*—Herbert L. Lerner; Laurence A. Greenberg; Werner H. Stemer

(57) ABSTRACT

The novel current-mode switching regulator does not determine the load current by picking off a measurement voltage at a measuring resistor, as in the conventional prior art. Instead, the voltage drop across the inductor which is required in any case is picked off as the measurement voltage. A regulating signal derived from the load current is determined, by integration with respect to time, with a voltage-controlled current source. The regulating signal is fed back, as a regulated variable, into regulators of the inner control loop. In this way, it is possible to dispense with the measuring resistor. An additional compensation device makes it possible, moreover, to compensate for a regulation deviation in the desired potential of the outer control loop.

13 Claims, 6 Drawing Sheets

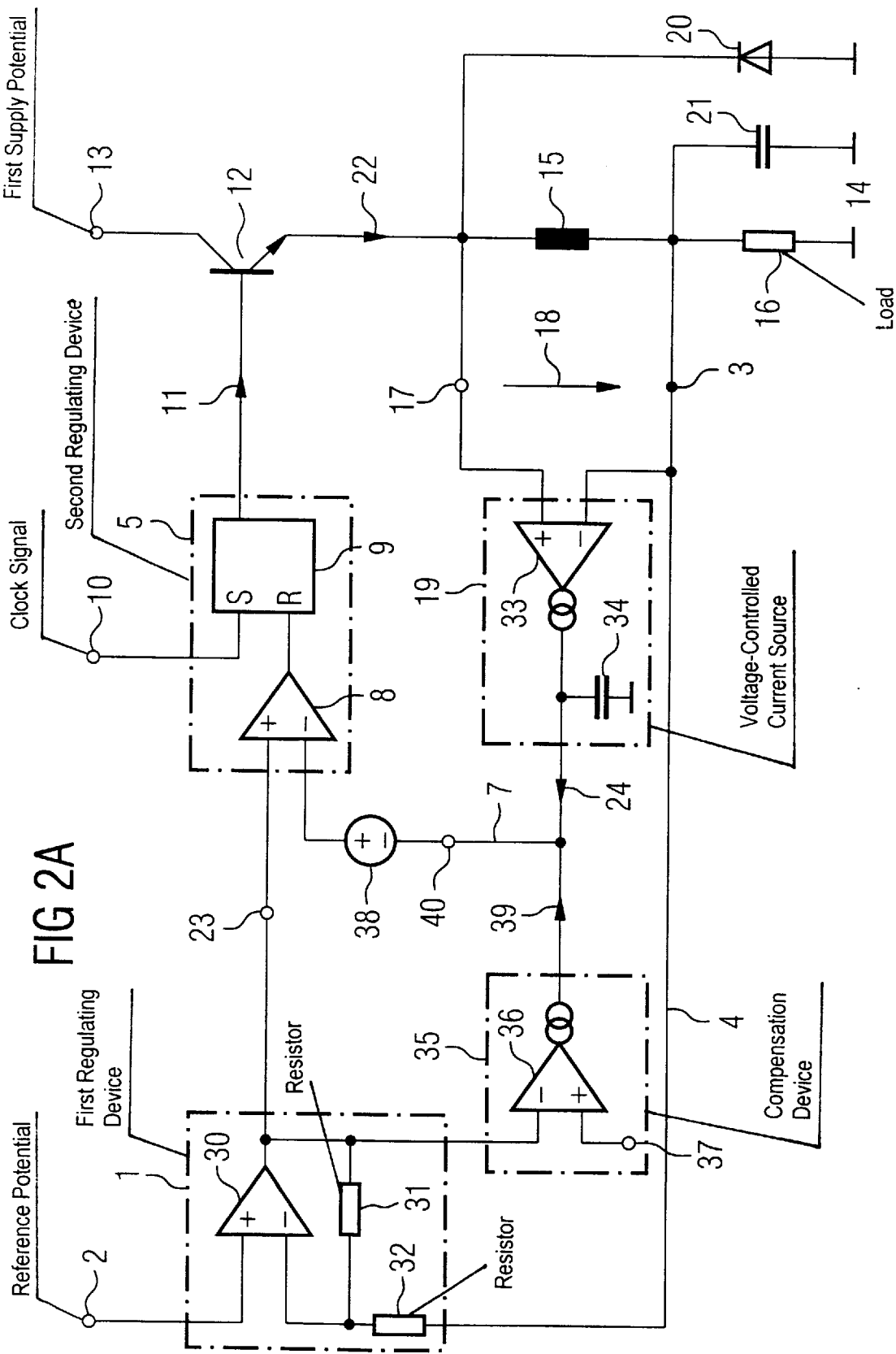

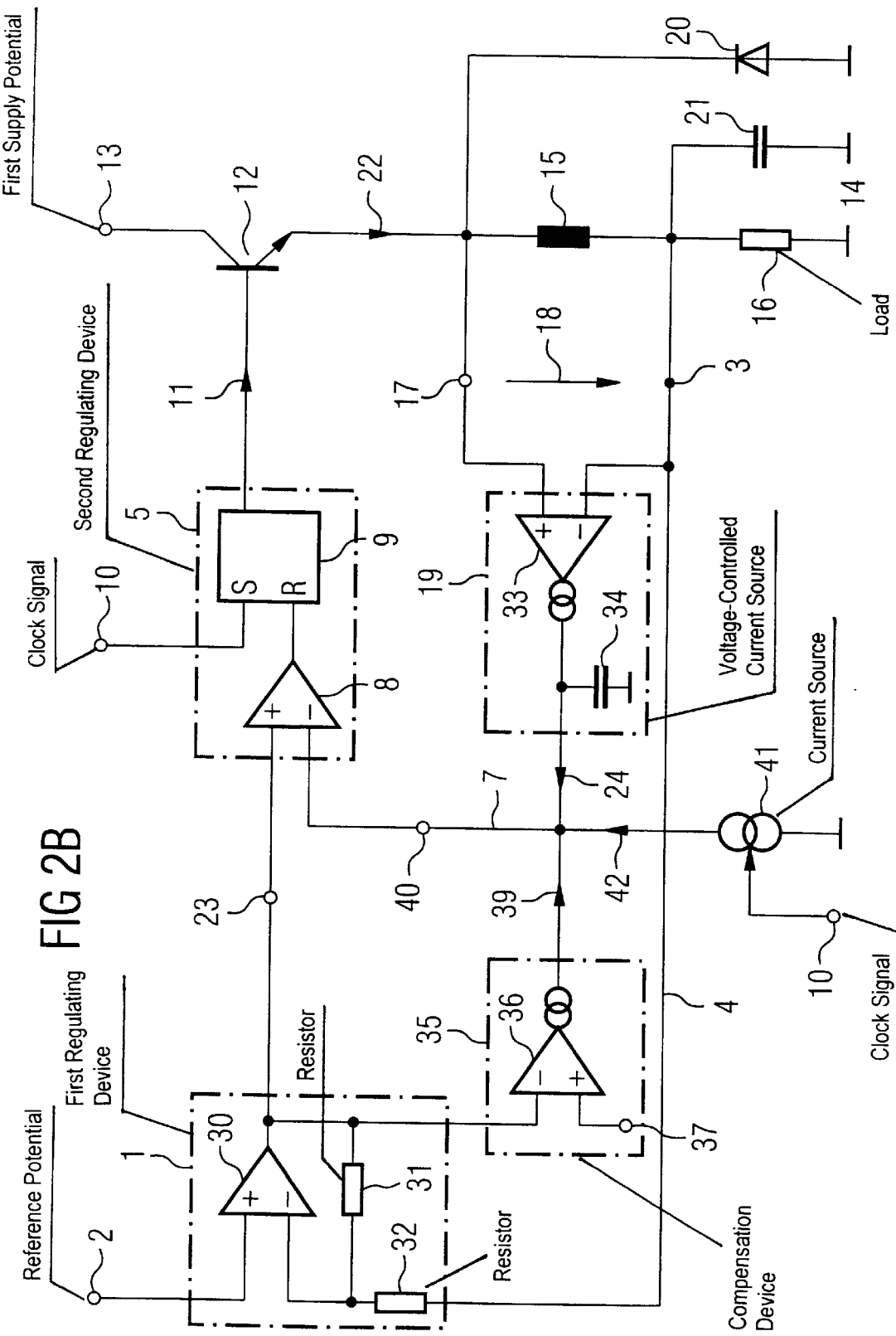

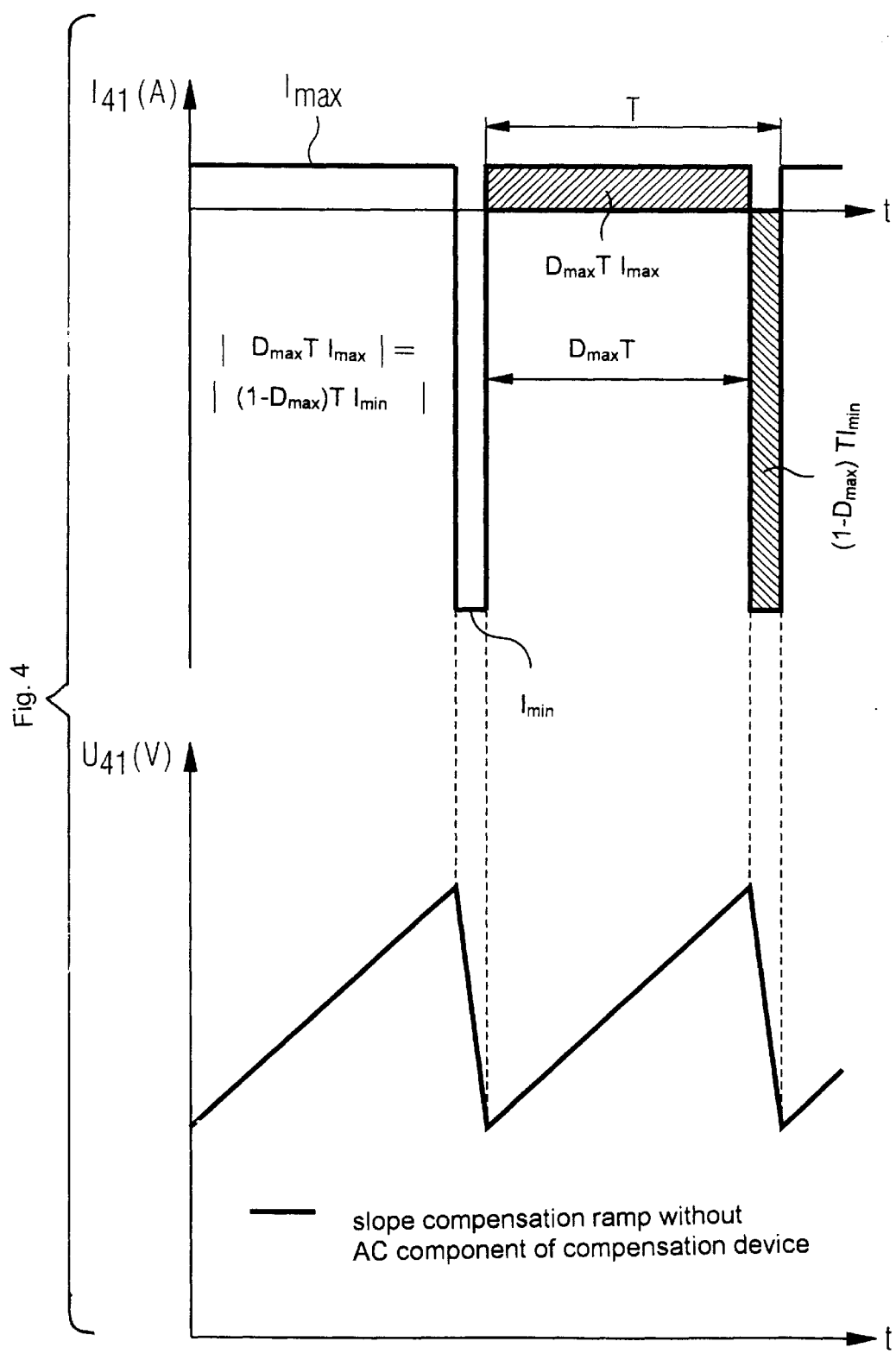

CURRENT MODE SWITCHING REGULATOR CONFIGURED SUCH THAT A MEASURING RESISTOR IS NOT NEEDED TO MEASURE THE CURRENT AT AN INDUCTOR

BACKGROUND OF THE INVENTION

Field of the Invention

The invention lies in the electronics field. Specifically, the invention relates to a current-mode switching regulator for power supply, in particular for application in switched-mode power supplies.

Switched-mode power supplies are disclosed for example in Tietze and Schenk, "Electronic Circuits —Design and Application," Springer-Verlag 1991, p. 502. Switched-mode power supplies of this type usually comprise a rectifier, a power switch provided for the purpose of pulse width modulation, a filter, and also a regulator for controlling the power switch. An input voltage—for example a rectified power supply system voltage—is converted into a pulsed DC voltage with a variable duty ratio by the power switch acting as pulse width modulator. In this case, the pulse frequency may be set to be variable or fixed.

The task of the regulator is to keep the voltage at the output of the filter constant over a wide output current range. In other words, the regulator has to process the voltage at the output of the filter and the current at the output of the filter as input variables and form from them a control signal for the power switch. In this case, the timing ratio of the switch is influenced by the control signal.

Essentially three different control strategies exist for the regulation of such switching regulators: voltage-mode regulation, feedforward regulation and current-mode regulation. These control strategies are described for example in R. E. Tarter, Solid-State Power Conversion Handbook, Wiley Interscience, New York, 1993.

Current-mode regulation thereby constitutes a particularly elegant and effective type of regulation which, moreover, requires only comparatively small compensation capacitances. It is thus ideal for use in integrated circuits.

Current-mode switching regulators have two control loops. The inner control loop thereby serves to regulate the load current, while the outer control loop serves, together with the inner control loop, to regulate the output voltage. When the switching transistor is switched on, the voltage across a measuring resistor caused by the current rising in ramped fashion through the inductor coil of the switching regulator likewise has a ramped profile. When a desired voltage predetermined by the outer control loop is reached, the switching transistor switches off.

In current-mode switching regulators, it has been necessary heretofore, as described above, for the load circuit to have a measuring resistor in order to detect the current at the inductor. For the current detection, this measuring resistor is typically designed with a low resistance and, on account of its losses, is not suitable for use in integrated circuits. Such measuring resistors have to be connected externally to the integrated circuits in a cost-intensive manner, which requires considerable outlay in the course of fabrication.

However, the provision of a, typically, external measuring resistor turns out not only to be disadvantageous for cost reasons, but also reduces the efficiency of the switching regulator. Since the measuring resistor typically has to be connected externally to the integrated circuit, it is sometimes necessary, apart from a greater space requirement on the circuit board, to provide an additional output terminal on the integrated circuit.

Finally, the voltage drop measured across the measuring resistor has, for each switching period, an initial voltage spike produced by charge reversal of parasitic capacitances when the power switch is switched on. These undesirable voltage spikes have to be blanked out by additional measures—such as e.g. so-called "leading edge current blanking"—which are complicated in terms of circuitry, since the voltage spikes would otherwise impermissibly corrupt the actual measured value.

SUMMARY OF THE INVENTION

It is accordingly an object of the invention to provide a so-called current-mode switching regulator, which overcomes the above-mentioned disadvantages of the heretofore-known devices and methods of this general type and which is better suited to implementation in integrated circuitry.

The current-mode switching regulator includes a first regulating device for voltage regulation and a second regulating device for load current regulation. Each of the first and second devices has a first input, a second input, and an output. The first input of the first regulating device is connected to receive a reference signal and the second input of the first regulating device is connected to receive an output signal of the current-mode switching regulator, as a regulated variable. The output of the first regulating device is connected to the first input of the second regulating device. A power switch is connected to the second regulating device and is controlled by a control signal of the second regulating device. The power switch has a load path connected between a first supply potential and a second supply potential. A choke device or inductor is connected the load path of the power switch. An integrator is connected to the choke device and to the second regulating device. The integrator generates a regulating signal by integrating, with respect to time, an inductor voltage drop across the inductor device. The regulating signal mirrors a load current and is coupled, as regulated variable, into the second input of the second regulating device.

With the current-mode switching regulator according to the invention, it is possible to dispense with a measuring resistor for detecting the measurement voltage, as has been customary heretofore. The measurement voltage necessary for the regulation of the load current is in this case picked off at the inductor itself, which is necessary in any case for the functioning of the switching regulator. The relationship between current I and voltage U across an inductance I is utilized in this case, i.e.

$$U = L \cdot dI/dt.$$

This inductor voltage U is subsequently fed to an integrator, e.g. a voltage-controlled current source with an integrating element connected downstream. In other words the voltage drop across the inductor is integrated over time. In this way, an additional measuring resistor typically of external design and having all the disadvantages described above is no longer necessary.

Other features which are considered as characteristic for the invention are set forth in the appended claims.

Although the invention is illustrated and described herein as embodied in a current-mode switching regulator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2A is a detailed circuit schematic of a first exemplary embodiment of the switching regulator according to the invention;

FIG. 2b is a detailed circuit schematic of a second exemplary embodiment of the switching regulator according to the invention;

FIG. 4 shows two time-related signal/time diagrams of a slope compensation of the switching regulator according to the invention illustrated in FIG. 2.

DESCRIPTION OF THE PREFERRED EMBODIMENTS

Figure 1:
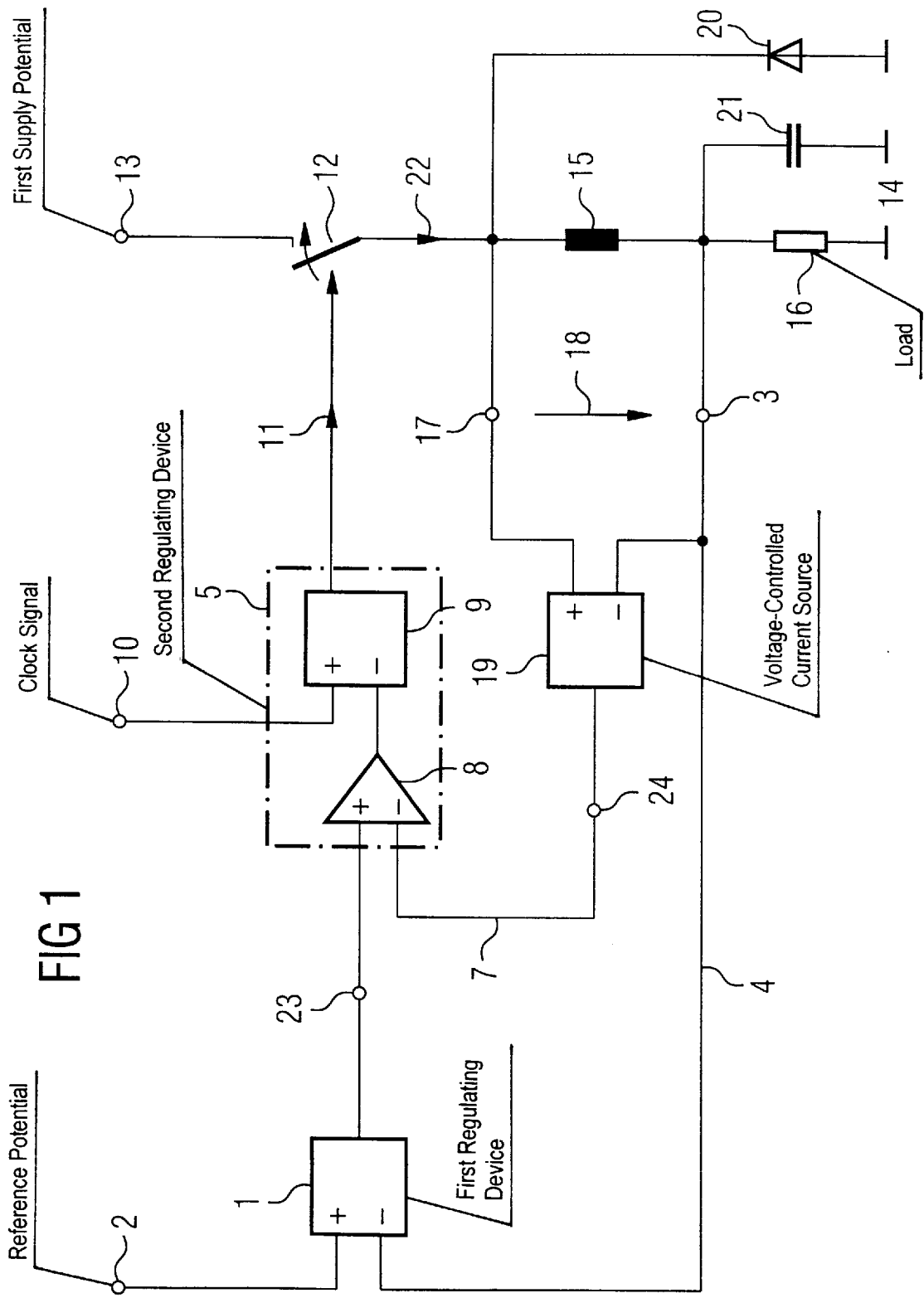
FIG. 1 is a circuit schematic of a current-mode switching regulator according to the invention.

Unless indicated otherwise, identical or functionally identical elements and signals are provided with the same reference symbols throughout the figures of the drawing.

Referring now to the figures of the drawing in detail and first, particularly, to FIG. 1 thereof, there is seen a general schematic block diagram of the current-mode switching regulator according to the invention. The switching regulator may be used, for example, in a switched-mode power supply.

The current-mode switching regulator in FIG. 1 contains a first regulating device 1. The first regulating device 1 has two regulating inputs and one output. In the present exemplary embodiment, a reference potential 2 is fed to the positive input of the first regulating device 1. The output potential 3 of the switching regulator is coupled, as regulated variable, into the negative input of the first regulating device 1 via a feedback path 4. A desired potential 23 can be picked off at the output of the first regulating device 1 and is fed to a second regulating device 5 connected downstream.

The second regulating device 5 may be formed for example by a device for pulse width modulation (PWM), to which the regulated variable can be fed via a feedback path 7. The PWM device comprises a PWM comparator 8, into whose positive input the desired potential 23 is coupled and into whose negative input a regulating signal 24 of the second regulating device 5 is coupled as the regulated variable. The output signal of the PWM comparator 8 is fed, together with a system clock signal 10, to a latch 9 connected downstream. A pulse width-modulated drive signal 11 can then be picked off at the output of the latch 9 and is used to drive the control terminal of a load current switch 12 connected downstream.

The load current switch 12 is connected between a first pole having a first supply potential 13 and a second pole having a second supply potential 14. In this case, the first supply potential 13 may be the input potential, while the second supply potential 14 may be the potential of the reference-ground potential.

Connected in series with the load current path of the power switch 12 is an inductor 15 and also a load 16, which need not necessarily be resistive. An output potential 3 of the current-mode switching regulator can be picked off at the tap between the inductor 15 and the load 16. A measurement potential 17 can be picked off at the tap between the inductor 15 and the power switch 12. The inductor voltage 18 dropping across the inductor 15 is fed to an integrator, e.g. a voltage-controlled current source 19. In this case, the measurement potential 17 is fed to the positive input and the output potential 3 to the negative input of the voltage-controlled current source 19. The voltage-controlled current source 19 generates the regulating signal 24 which, as mentioned above, is fed, as the regulated variable, to the PWM device via the feedback path 7.

A freewheeling element 20 and also an element for voltage smoothing 21 are additionally provided in FIG. 1. In this case, the freewheeling element 20 is provided as a freewheeling diode, while the element for voltage smoothing is designed as a smoothing capacitor 21. The smoothing capacitor 21 is in this case connected in parallel with the load 16, while the freewheeling diode 20 is connected between reference ground 14 and the tap of the power switch 12 and the inductor coil 15.

The controllable power switch 12 may be formed by any type of field effect-controlled transistors, controlled bipolar transistors or similar controllable switches. All that is essential here is that the controllable power switch 12 is suitable for the switching of a (pulsed) load current 22 in the load circuit of the switching regulator.

In the present exemplary embodiment, the inductor coil 15 is connected between the load 16 and the power switch 12. However, the inductor coil 15 may also be connected between the power switch 12 and the first pole of the supply voltage source 13. The inductor 15 may be formed as a coil, as part of a transformer or a similar inductive element. All that is essential here is that the inductor be arranged in the load circuit of the switching regulator.

The smoothing capacitor 21 and the inductor 15 serve respectively to smooth the output potential 3 and the load current 22 of the current-mode switching regulator. In this case, the freewheeling element 20 serves to protect the power switch 12 against destruction in the event that its reverse voltage is exceeded.

The first regulating device 1 is also typically referred to as an outer control loop, while the second regulating device 5 is referred to as an inner control loop. In this case, the first regulating device 1 serves to regulate the output potential 3 of the switching regulator, while the second regulating device 5 is provided for the regulation of the load current 22.

The second regulating device 5 typically, but not necessarily, has a PWM device in accordance with FIG. 1. All that is essential here is that the second regulating device 5 has means for regulating the load current 22.

In the circuit arrangement according to FIG. 1, unlike what has been customary heretofore, the measurement voltage is not picked off at a resistive measuring element, for example a measuring resistor, and fed back as a regulated variable of the inner control loop. Rather, the voltage across the inductor 15 which is present in any case and is absolutely necessary is picked off in this case. This inductor voltage 18 is then fed to an integrator. In this way, the load current 22 is determined by measurement of the voltage drop 18 across the inductor 15 and integration with respect to time. A regulating signal 24 derived from the load current 22 can then be picked off at the output of the voltage-controlled current source, which regulating signal can be fed to the PWM device as regulated variable of the inner control loop.

The precise functioning of the current-mode switching regulator according to the invention will now be explained in more detail with reference to the detail circuit schematic of FIGS. 2A and 2B, collectively referred to as FIG. 2. The two views of FIG. 2 specify a preferred exemplary embodiment of the circuit according to the invention as shown in FIG. 1. The preferred exemplary embodiment having additional means for compensating for a regulation deviation of the outer control loop.

In FIG. 2, the first regulating device 1 is implemented as an amplifier whose gain is, as a rule, frequency-dependent. The first regulating device 1 contains a comparator 30, between whose output and negative input a first resistor 31 is connected. A second resistor 32 is connected in series with and upstream of the parallel circuit formed by the comparator 30 and the resistor 31. Consequently, as is known, the gain factor of the amplifier and hence of the first regulating device 1 can be dimensioned by way of the ratio of the resistances of the first resistor 31 and of the second resistor 32.

In FIG. 2, the PWM device 6 is realized by a PWM comparator 8 and an RS flip-flop 9 connected downstream of the PWM comparator 8. In this case, the output signal of the PWM comparator 8 is coupled into the reset input and the system clock signal 10 into the set input of the RS flip-flop 9. The pulse width-modulated drive signal 11 which can be picked off at the output of the RS flip-flop 9 is fed to the control terminal of the power switch 12 connected downstream. The power switch 12 is in this case realized as an npn bipolar transistor. The latch designed as RS flip-flop 9 is used to the effect that in each case only one pulse per clock period is fed to the control terminal of the power switch 12 connected downstream. In the steady state and with the power switch 12 closed, on average a constant load current flows.

In FIG. 2A, the voltage-controlled current source 19 controlled by the inductor voltage 18 is designed as a transconductance amplifier 33 with an integrating element 34 connected downstream. A capacitor is connected as integrating element 34 between the output of the transconductance amplifier 33 and the second pole of the supply voltage source. It would also be conceivable, of course, to use an operational amplifier as the voltage-controlled current source 19, but this possibility would be considerably more complicated in terms of circuitry.

The transconductance amplifier generates an output current from the measurement voltage across the inductor 15, that is to say from the difference between the measurement potential 17 and the output potential 3. The output current is integrated over time by means of the integrating element 34. The integrated output current 24 then mirrors the load current 22, i.e., it maps the load current proportionally. Via the feedback path 7, the resultant regulating potential 40 is then fed back via a voltage source 38, which serves to realize the required, so-called "slope compensation," as the regulated variable of the inner control loop. The inertia of this inner control loop or of the second regulating device 5 can in this case be dimensioned by way of the capacitor 34. The "slope compensation" ensures a stable duty cycle above 50% in a current-mode switching regulator. In order to ensure the stability, the "slope compensation" is intended to superpose a voltage ramp on the regulating signal 40 fed to the second regulating device 5. By this means the duty cycle can also be kept stable at values above 50%.

A particularly simple realization of the "slope compensation" is illustrated in FIG. 2B. There, a current source 41 is provided which, under the control of the system clock signal 10, feeds a pulsed current into the integrating element 34. Given a suitable amplitude of the current pulses, the voltage ramp required for slope compensation is produced on account of the integrating action of the integrating element. The advantage over a conventional realization is that the outlay on circuitry remains very low.

The generation of the voltage ramp becomes evident from FIG. 4. As a result of the suitable maximum current $I_{max}$ and minimum current $I_{min}$ being impressed, the desired voltage ramp is produced as a function of the duty cycle and also of the storage capacitance of the integrating element 34 (cf. bottom part of FIG. 4).

A so-called "feedforward regulating circuit" for compensating for a regulation deviation in the desired voltage of the outer control loop is additionally provided in FIG. 2. For this purpose, a compensation device 35 is provided, which contains a second transconductance amplifier 36 and a capacitor. The desired potential 23 of the first regulating device 1 is fed to the negative input of the transconductance amplifier 36. A second desired potential 37 of a desired value voltage source is fed to the positive input of the transconductance amplifier 36. A compensation signal 39 can then be picked off at the output of the compensation device, which compensation signal, together with the output current 24 via the feedback path 7, generates the regulating potential 40 and is coupled into the regulating input of the PWM device.

The functionality of the compensation device 35 will now be explained in more detail:

As explained above, the gain factor of the comparator 30 and hence of the first regulating device 1 is produced by way of the ratio of the resistances of the resistors 31 and 32. If, however, the comparator 30 has an excessively small gain, then this may result in a regulation deviation in the output signal of the first regulator device 1, i.e. this may result in a deviation of the desired potential 23 generated by the first regulating device 1 on the output side from a predetermined desired potential 37.

It is possible to increase the gain factor of the comparator 30 by suitable dimensioning of the resistors 31, 32 only to a limited extent, however, since if the gain is excessively large, the outer control loop is not stable and begins to oscillate. By way of example, given a gain factor V=10, the result is a regulation deviation of the desired potential 23 of the first regulating device 1 from the predetermined desired potential 37 of approximately 10%.

In order to compensate for this regulation deviation, the desired potential 23 of the first regulating device 1 is fed to the compensation device 35. In the event of a regulation deviation, a compensation signal 39 is generated at the output of the compensation device 35. This DC voltage signal 39 is superposed on the AC voltage signal 24 provided on the output side of the voltage-controlled current source 19. A DC voltage signal 40 superposed with AC voltage is then fed, as regulated variable, into the PWM device. Consequently, in the event of a regulation deviation in the desired potential 23, a DC component corresponding to the regulation deviation is coupled into the negative input of the PWM device for the purpose of compensation. The effect achieved in this way is that the output voltage of the outer regulator and hence also the input voltage of the latter are at a fixed, that is to say the predetermined desired value level of the desired potential. This prevents a regulation deviation from being maintained in the output signal of the outer control loop and thus having an adverse effect on the stability of the regulating system.

In the event of small regulation deviations, it is not necessary, and frequently not desirable either, for said deviations to be corrected immediately, i.e. dynamically without delay. Therefore, an element determining the inertia of the compensation device is typically provided, which element is typically formed by a capacitor. In FIG. 2, this capacitor is advantageously formed by the capacitor 34 of the voltage-controlled current source 19. A capacitor can be saved in this way.

Figure 5:
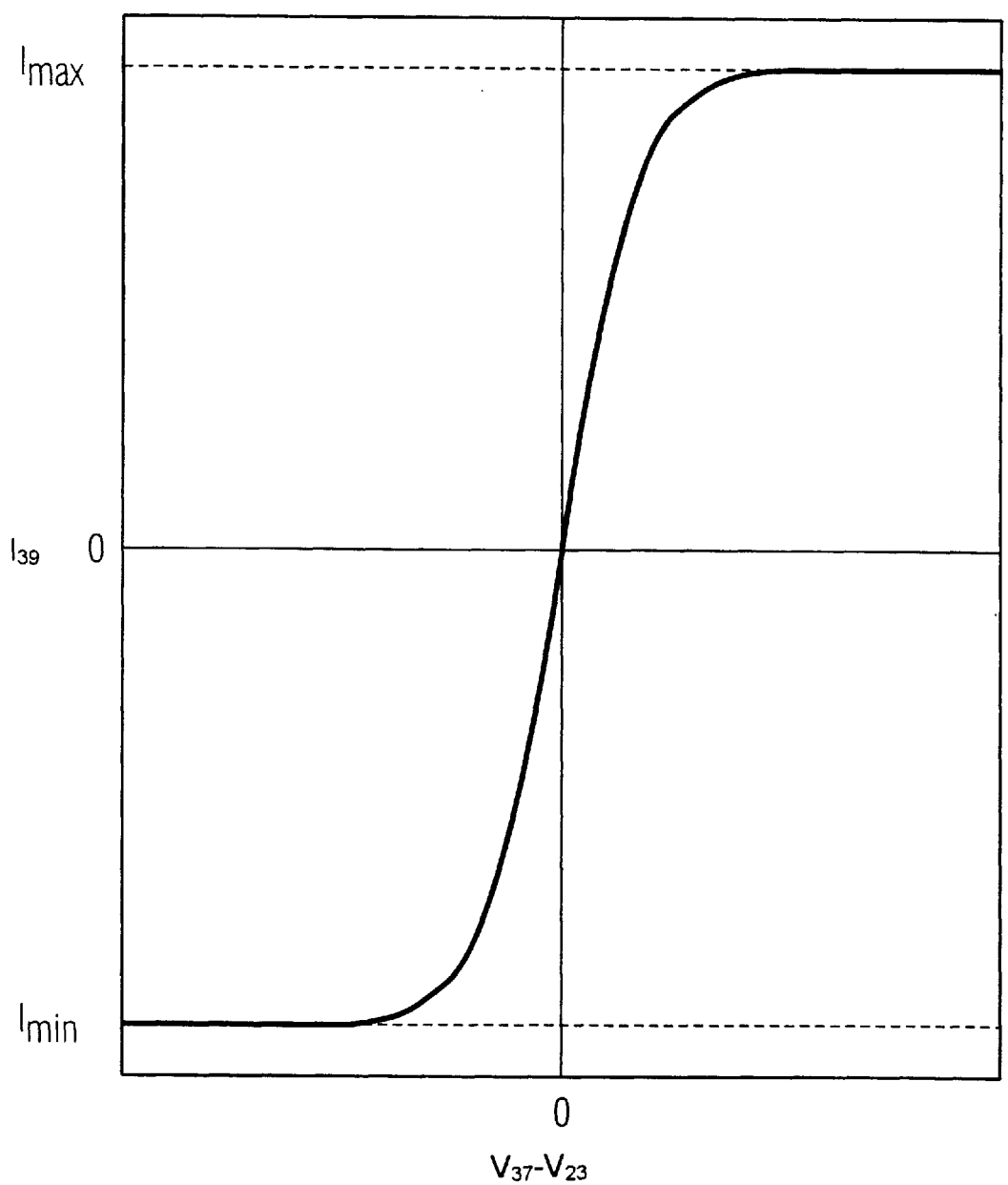
FIG. 5 is a characteristic curve of a transconductance amplifier with output current limiting.

The implementation of the transconductance amplifier 36 as a current-limiting element is particularly advantageous. As illustrated in FIG. 5, the output current is limited in this case as soon as the voltage difference at the input exceeds or falls below a specific value. The particular advantage of a limiting element is that, with active limiting, the damping of the entire control loop increases considerably, while a very high regulation accuracy can be achieved at the same time. As long as the output voltage $V_3$ at 3 of the switching regulator deviates distinctly from its desired value, the difference between the voltages $V_{37}$ at 37 and $V_{23}$ at 23 is correspondingly large, the output current $I_{39}$ at 39 of the transconductance amplifier 36 is limited and the control loop operates with very high damping. Only when the output voltage $V_3$ has approximated sufficiently to its desired value is the output current of the transconductance amplifier 36 reduced and the damping decreases. Consequently, the damping of the control loop increases as the regulation deviation increases, with the result that sufficient damping of the control loop as well as high regulation accuracy can be simultaneously achieved.

As is known, the compensation device is an integrator and can therefore be formed, in a similar manner to the integrator 19, by any type of voltage-controlled current sources. Consequently, the voltage-current conversion of the compensation device 35 is also not necessarily restricted to a transconductance amplifier 36, but rather may also be replaced by an operational amplifier, by way of example.

Figure 3A:
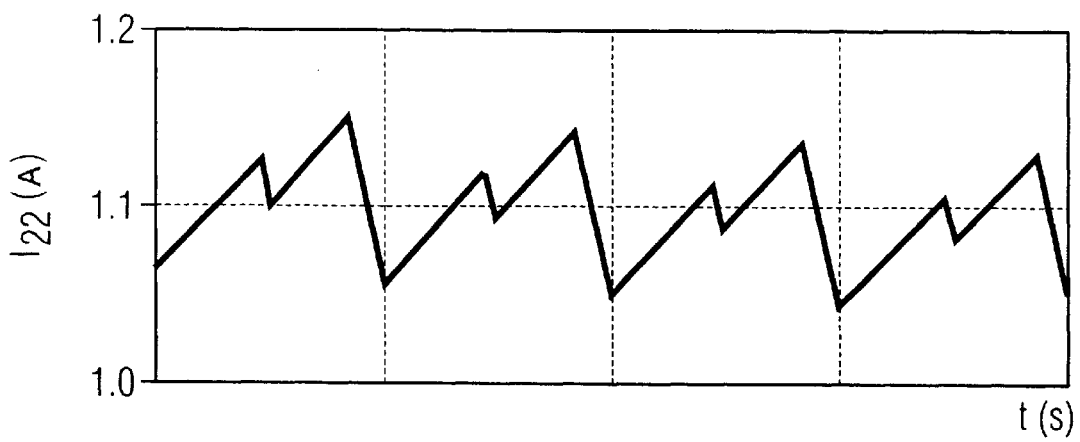
FIGS. 3A to 3C are signal/time diagrams of the switching regulator according to the illustration of FIG. 2.
Figure 3B:
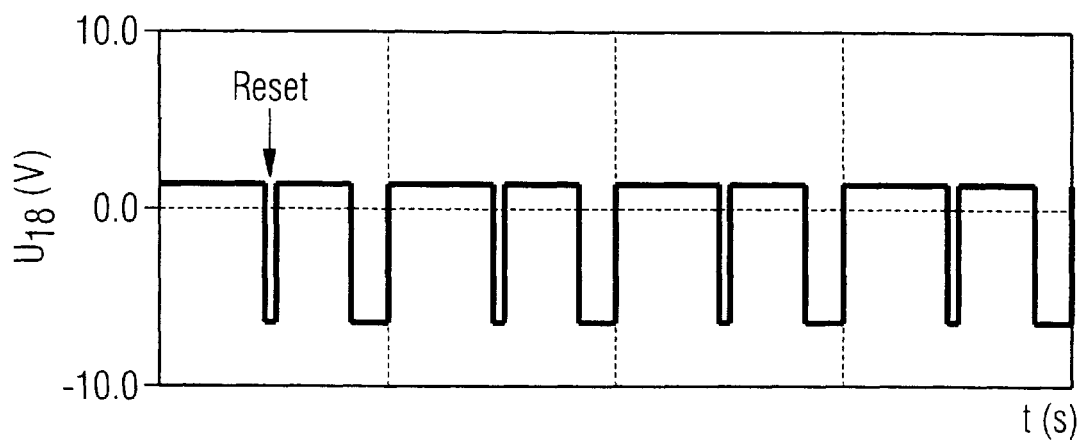
Figure 3C:
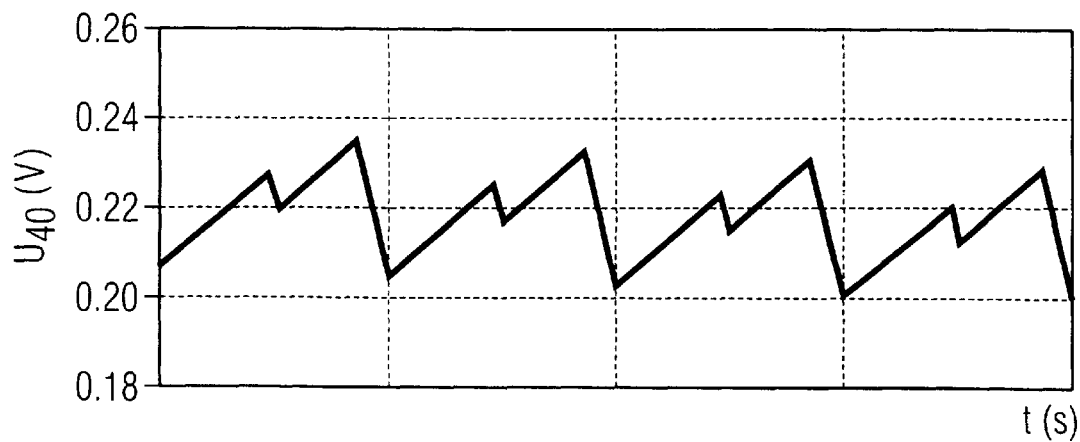

FIG. 3 shows three signal/time diagrams of the circuit according to the invention in accordance with FIG. 2. In a simulation of the circuit arrangement according to FIG. 2, FIG. 3A shows the time profile of the load current 22, FIG. 3B shows the time profile of the inductor voltage 18 and FIG. 3C shows the time profile of the load current 22 determined by the voltage-controlled current source 19 at which the DC voltage component of the regulating signal was "corrupted" by the compensation signal 39 of the third regulating device.

In the settled steady state, a load current 22 is established in the load circuit of the switching regulator (FIG. 3A). The measured inductor voltage 18 represents the time derivative of this load current 22 (FIG. 3B). Integration of the rectangular-waveform inductor voltage 18 then results in a regulating potential 40 having exactly the same waveform as the load current 22.

The current-mode switching regulator is designed as a step-down converter (buck converter) in FIGS. 1 and 2. However, the invention is not restricted to a step-down converter but rather can be used in any current-mode switching regulator, such as, for example, in a step-up converter (boost converter), flyback converter, or converters derived therefrom.

The preferred, but not necessarily exclusive application of the current-mode switching regulators according to the invention is in switched-mode power supplies. The invention is particularly advantageous in a switched-mode power supply having a current-mode switching regulator.

What is claimed is:

1. A current-mode switching regulator, comprising:

a first regulating device for voltage regulation and a second regulating device for load current regulation, each of said first and second devices having a first input, a second input, and an output, and whereby
said first input of said first regulating device is connected to receive a reference signal and said second input of said first regulating device is connected to receive an output signal of the current-mode switching regulator, as a regulated variable; and
said output of said first regulating device is connected to said first input of said second regulating device;

a power switch connected to said second regulating device and controlled by a control signal of said second regulating device, said power switch having a load path connected between a first supply potential and a second supply potential;

a choke device connected in said load path of said power switch; and an integrator connected to said choke device and to said second regulating device, said integrator generating a regulating signal by integrating, with respect to time, an inductor voltage dropping across said choke device, said regulating signal mirroring a load current and being coupled, as regulated variable, into said second input of said second regulating device.

2. The switching regulator according to claim 1, wherein said integrator is a voltage-controlled current source.

3. The switching regulator according to claim 1, wherein said integrator is a first transconductance amplifier with a capacitive element connected at an output thereof.

4. The switching regulator according to claim 1, wherein said integrator is an operational amplifier with a capacitive element connected to an output thereof.

5. The switching regulator according to claim 1, wherein said second regulating device includes a pulse width modulator with at least a pulse width-modulated comparator and a clocked storage device.

6. The switching regulator according to claim 1, wherein said power switch is a transistor selected from the group consisting of field effect controlled transistors and bipolar transistors.

7. The switching regulator according to claim 1, wherein the switching regulator has a step-down converter.

8. The switching regulator according to claim 1, which comprises a capacitor for signal smoothing connected in said load path.

9. The switching regulator according to claim 1, which further comprises a compensation device connected to said second regulating device for generating, if a regulation deviation occurs in said first regulating device, a compensation signal derived from the regulation deviation, wherein the compensation signal is superposed on the regulating signal derived from the load current and is coupled, as regulated variable, into said second regulating device.

10. The switching regulator according to claim 9, wherein said compensation device has an output signal with a limited output quantity.

11. The switching regulator according to claim 9, wherein said compensation device compensates in a slow-acting manner, with said integrating element of said first regulating device acting as an inertia-determining element.

12. The switching regulator according to claim 1, wherein said integrator is a first transconductance amplifier with a capacitive integrating element connected at an output thereof, and including a clocked current source outputting a pulsed current to said integrating element, wherein the pulsed current is integrated together with the regulating signal derived from the load current and is coupled, as a regulated variable, into said second regulating device.

13. The switching regulator according to claim 1, wherein said choke device is an inductor.

* * * * *